United States Patent [19]

Leitner

[11] Patent Number: 5,267,741
[45] Date of Patent: Dec. 7, 1993

[54] DRIVE FOR A DRILL CHUCK EQUIPPED WITH A TORQUE COUPLING

[76] Inventor: Kajetan Leitner, Waldfriedhofstr. 7, D-7470 Albstadt 2

[21] Appl. No.: 867,750

[22] Filed: Apr. 10, 1992

[30] Foreign Application Priority Data

Apr. 12, 1991 [DE] Fed. Rep. of Germany ... 9104489[U]

[51] Int. Cl.⁵ .............................................. B23B 31/12
[52] U.S. Cl. ........................................ 279/62; 279/140
[58] Field of Search ..................... 279/60, 61, 62, 64, 279/140

[56] References Cited

U.S. PATENT DOCUMENTS

| | | |
|---|---|---|
| 2,974,535 | 3/1961 | Morris . |
| 5,044,643 | 9/1991 | Nakamura ............. 279/60 |
| 5,145,193 | 9/1992 | Röhm ..................... 279/62 |

FOREIGN PATENT DOCUMENTS

| | | |
|---|---|---|
| 2528423 | 1/1976 | Fed. Rep. of Germany . |
| 2739489 | 6/1981 | Fed. Rep. of Germany . |
| 2148352 | 2/1982 | Fed. Rep. of Germany . |
| 3443186 | 5/1986 | Fed. Rep. of Germany ........ 279/62 |
| 2232387 | 1/1975 | France . |
| 27804 | 1/1989 | Japan ..................... 279/61 |
| 668927 | 2/1989 | Switzerland . |

OTHER PUBLICATIONS

"Neuartiges Spannfutter fur Gewindebohrer mit einstellbarer Sicherheitskupplung," G. Teichmann: Neuartiges Spannfutter fur Gewindebohrer, p. 509 (Nov. 1955).

Primary Examiner—Timothy V. Eley
Attorney, Agent, or Firm—Speckman, Pauley & Fejer

[57] ABSTRACT

A drive of a drill chuck having a torque coupling which can be placed on a drive shaft of a motor via a base element on a side opposite of chuck jaws. A torque coupling having meshing ball bearing collars is inserted between the base element and the chuck jaws. A spring-loaded driven end of the torque coupling is connected with the base element and a take-off end of the torque coupling is connected with a jaw housing which guides the chuck jaws, each being fixed against relative rotation. A ring abutment for the spring-loaded driven end is fixed on the base element. A cylindrical sleeve projects from the ring abutment in a direction toward the chuck jaws, which are rotationally movable. The cylindrical sleeve overlaps a fitted cylindrical pipe which is positioned on the jaw housing and encloses the torque coupling.

13 Claims, 1 Drawing Sheet

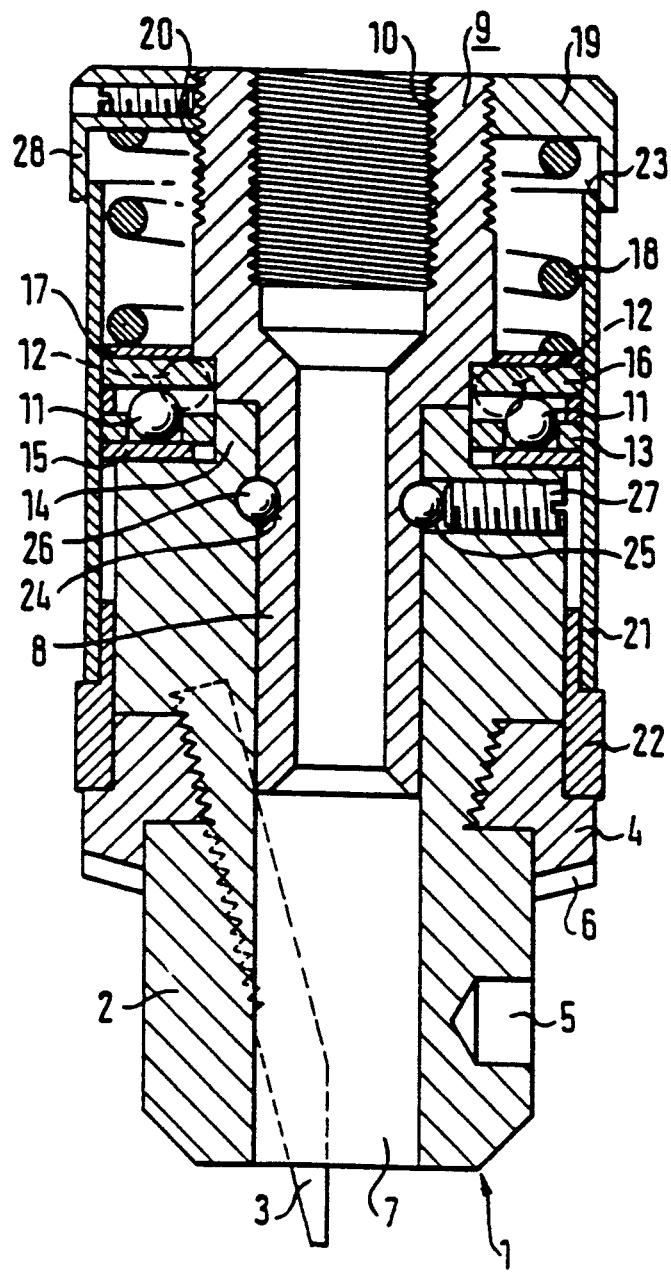

DRIVE FOR A DRILL CHUCK EQUIPPED WITH A TORQUE COUPLING

BACKGROUND OF THE INVENTION

1. Field of the Invention

This invention relates to a drive of a drill chuck equipped with a torque coupling, which can be placed on the drive shaft of a motor via a base element on the side opposite the chuck jaws.

2. Description of Prior Art

Such a drive is known from U.S. Pat. No. 2,974,535. This drive is embodied such that a torque coupling containing ball bearing collars is threadedly engaged on the drive shaft of the motor and ends in a drive pin having a thread, on which a conventional drill chuck can be screwed. The respective tool is considerably elongated by this embodiment because it has the threaded parts, between which the torque coupling is housed, extending at both sides from the torque coupling. In addition, the embodiment of the torque coupling, which can be seen in the drawings of U.S. Pat. No. 2,974,535, shows a considerable expenditure on both sides of the actual coupling area containing the ball bearing collars.

SUMMARY OF THE INVENTION

It is one object of this invention to provide a drive for a drill chuck in which the torque coupling is integrated into the drill chuck in such a way that it results in only a negligible extension of the drill chuck and that its parts harmoniously cooperate with the torque coupling.

The above object of this invention is accomplished with a torque coupling, containing meshing ball bearing collars, inserted between the base element and the chuck jaws in such a way, that its driven end is connected with the base element and its take-off end is connected with a jaw housing guiding the chuck jaws, each one fixed against relative rotation. A ring-like abutment for the spring-loaded drive end is fixed o the base element. A cylindrical sleeve projects from the abutment in the direction towards the chuck jaws which, rotationally movable, overlaps a fitted, cylindrical pipe which is positioned on the jaw housing and encloses the torque coupling.

According to such preferred embodiment, the drill chuck is integrated into the torque coupling, because the torque coupling is inserted directly between the base element and the jaw housing so that in principle there is only a two-part embodiment of the drill chuck, which is closed off towards the exterior by the sleeve and the pipe enclosing the torque coupling. Thus, a relatively short, enclosed and uniform component is created.

The abutment can be used advantageously as an adjustment element for the releasing torque of the torque coupling, since that abutment is screwed on the base element and since the length to which it is engaged with determines the releasing torque of the torque coupling via a spring arrangement which acts upon the driven end. The farther the abutment is screwed on the base element, the more the spring arrangement acting on the driven end of the torque coupling is tightened. Thus, the releasing torque of the torque coupling is correspondingly increased. In this case, the pipe enclosing the torque coupling can be practically used as a limit for the amount of the releasing torque, namely in that the pipe enters the sleeve and opposes, as a kind of stop, with its front the abutment which, with the appropriate amount of engagement, runs up against the front surface and in this way determines the maximum releasing torque. When the front surface of the pipe meets the abutment, the spring arrangement tightened by the threadedly engageable abutment reaches its maximum tension, and the maximum releasing torque is determined. The stop provided by the front of the pipe takes up such a position with respect to the threadedly engageable abutment that upon meeting of the front with the abutment the ball bearing collars which engage each other can, at correspondingly high torque, just slide over each other so that blocking of the torque coupling is prevented. However, the effect of blocking prevention can also be attained by an appropriate sizing of the thread, where its end limits the adjustability of the abutment.

The spring arrangement may include a single helical spring, but it is also possible to use a ring of a plurality of paraxially disposed helical springs, which almost fill the available free space both radially as well as circumferentially. The ring may include an even number of springs which are alternately wound left and right. In pace of helical springs it is also possible to use a plurality of compressible rings, 0-rings, as spring elements, so that different torque ranges can also be set by the combination.

A compact embodiment of the drill chuck is practically designed such that the base element, penetrating the ball bearing collars with its shaft, projects coaxially into the jaw housing to form a pivot bearing which acts to release the torque coupling, the shaft being axially secured with respect to the jaw housing. This results in simple axial guidance of the base element and the jaw housing inside of the elements of the torque coupling. In this embodiment, axial securing between the shaft of the base element and the jaw housing is caused by both shaft and jaw housing being equipped with opposed annular grooves which guide a ring of ball bearings.

BRIEF DESCRIPTION OF THE DRAWING

One preferred embodiment of this invention is illustrated in the drawing figure which shows a cross section of the drill chuck.

DESCRIPTION OF PREFERRED EMBODIMENTS

Shown in the drawing is the drill chuck 1, in the jaw housing 2 of which the drill jaws 3 are seated. For the sake of simplicity of the drawing, only one of the typical three drill chucks is shown. In this case, it is a conventional structure of a drill chuck with a setting ring 4 which, when rotated around the shaft of the drill chuck 1, the drill jaws 3 are extended to a greater or lesser degree out of the drill chuck 1 and to clamp a tool in particular a drill. In order to be able to exert the necessary force on the setting ring 4, a conventional key, not shown, with conical teeth is used. In this case, the key is guided by its shaft in the bore 5. Its teeth engage the counter teeth 6 provided on the setting ring 4, so that when the key is rotated around the shaft guided in the bore 5, the setting ring 4 is rotated around the jaw housing 2.

The shaft 8, which forms a pivot bearing with respect to the jaw housing 2, extends into the bore 7 of the jaw housing 2, so that the jaw housing 2 can rotate with respect to the shaft 8 in the manner of sliding bearing.

However, in normal operation this ability to rotate is canceled out because of the effect of the torque coupling, which will be described further below. The shaft 8 is a component of the base element 9 which, in a conventional manner, is used for the force-locked connection of the drill chuck 1 with a drive motor, not shown in the drawing. The base element 9 has an interior thread 10 for this purpose, by means of which it can be screwed on the drive shaft projecting it from the drive motor.

The connection necessary for transferring torque between the base element 9 and the chuck housing 2 is in this case provided by a known torque coupling, such as described and illustrated in German Letters Patent 27 39 489, which is incorporated into this specification by reference thereto. Essentially, the torque coupling comprises two meshing ball bearing collars, one of the ball bearing collars comprising the balls 11 and the balls 12 identified by dashed lines. The illustration shown in the drawing thus essentially corresponds to FIG. 2 of German Letters Patent 27 39 489. With the preferred embodiment shown in dashed lines, each ball bearing collar contains six balls, which are evenly and coaxially distributed around the shaft 8. The balls 11 of the ball bearing collar associated with the chuck housing 2 are maintained in the perforated disk 13 so that the perforated disk 13 is taken along when the respective ball bearing collar is rotated. The perforated disk 13 is secured against rotation with respect to the jaw housing 2 for example by meshing the perforated disk 13 and the collar 14 of the jaw housing 2 in the manner of a hexagon. The balls 11 are supported in the direction towards the jaw housing 2 on the support disk 15. The balls 12 of the other ball bearing collar are maintained in a corresponding manner by the perforated disk 16. The perforated disk is positioned, secured against relative rotation, on the base element 9 with a hexagon, the same as in the perforated disk 13. Rotating the perforated disk 16 takes along the balls 12, which then laterally run up against the balls 11 and carry the balls 11 along. They are further taken along in the manner described above, so that a torque generated at the perforated disk 16 is transferred by the above described torque coupling to the jaw housing 2.

The balls 12 of the second ball bearing collar are supported on the support disk 17 which, in contrast to the support disk 15, is axially displaceable, while the support disk 15 is supported directly on the jaw housing 2. The support disk 17 is acted upon by the helical spring 18, by means of which the support disk 17 is biased in the direction towards the balls 12. On the side facing away from the support disk 12, the spring 18 is supported on the ring abutment 19, which is screwed on the exterior thread 20 of the base element 9. The exterior thread 2 is cut into the base element 9 far enough so that the abutment 19 can be screwed on the base element 9, over an appropriate area. The farther the abutment 19 is screwed onto the base element 9 in the direction towards the support disk 17, the more the spring 18 is pre-stressed. If a maximum torque determined by the tension of the spring is exceeded while the base element 9 is driven, the balls 11 push the balls 12 back in an axial direction and the support disk 17 correspondingly backs up against the tension of the spring 18. If a position of the support disk 17 is attained in which the balls 12 can glide over the balls 11, the release torque of the torque coupling is attained, since in this case nothing is taken along any longer within the torque coupling. Reference is made to the corresponding explanations in German Letters Patent 27 39 489. The two perforated disks 13 and 16 are securely held in the axial direction by the jaw housing 2 and the base element 9; more detailed mention of the axial securing of the jaw housing 2 and the base element 9 being made further below.

As mentioned above, the abutment 19 can be rotated on the base element 9 to a greater or lesser extent. In this way, it is possible to set the respective release torque. This adjustability of the abutment 19 is limited by the pipe 21 positioned on the jaw housing 2. The pipe 21 is placed on the knurled ring 22 which is customarily present in conventional drill chucks, where the knurled ring 22 is fixedly connected with the setting ring 4 and, because of its knurling, rotation of the setting ring 4 by hand is also possible. A stop is formed with respect to the abutment 19 by its front 23 being oriented towards the abutment 19, so that the abutment 19 can only be screwed on the exterior thread 20 of the base element 9 far enough for the abutment 19 to run up against the front 23, the sleeve 28 enclosing the pipe 21 on the side of the stop 23. In this way, the abutment 19 has reached the maximum length to which it can be threadedly engaged, which determines the maximum release torque. However, at this screwed-on length there is sufficient play for the spring 18, so that the balls 12 can slide over the balls 11, because of which blocking of the torque coupling is assuredly prevented.

In place of the helical spring 18, it is possible to use a plurality of plate springs or a ring of several paraxially positioned helical springs, which almost fill the available free space radially as well as circumferentially. The ring has an even number of springs which are alternately wound left and right, and thus the springs do not become entangled in each other.

Here the securing against an axial displacement of the shaft 8 with respect to the jaw housing 2 is achieved since the shaft 8 and the jaw housing 2 have oppositely located grooves 24 and 25, which are filled with a ring of balls 26. Both grooves 25 and 26 are embodied as rounded grooves with a radius corresponding to that of the balls 26. In order to be able to insert the balls 26 after insertion of the shaft 8 into the jaw housing 2, the bore closed off by the worm screw 27 is in the jaw housing 2. The required axial securing of the shaft 8 and the jaw housing 2 is accomplished by the balls 26 filling up the two grooves 24 and 25.

The inclusion of the above described torque coupling into the drill chuck 1 protects it, a drill clamped by it and the respective drive motor against an overload because, depending on the release torque set, the torque coupling is released if there is danger of an overload to one of these components.

I claim:

1. In a drive of a drill chuck having a torque coupling which can be placed on a drive shaft of a motor via a base element on a side opposite chuck jaws, the improvement comprising: a torque coupling containing meshing ball bearing collars (11, 12) inserted between said base element (9) and said chuck jaws (3), a spring-loaded driven end (16) of said torque coupling connected with said base element (9) and a take-off end (13) of said torque coupling connected with a jaw housing (2) guiding said chuck jaws (3), each said chuck jaw (3) fixed against relative rotation with respect to each other, a ring abutment (19) for the spring-loaded driven end (16) fixed on said base element (9), and a cylindrical sleeve (28) projecting from said ring abutment (19) in a direction towards said chuck jaws (3), said ring abutment (19) being rotationally movable with respect to said base element (9), said cylindrical sleeve (28) overlapping a fitted cylindrical pipe (21) positioned on said jaw housing (2) and enclosing the torque coupling.

2. A drill chuck in accordance with claim 1, wherein said ring abutment (19) is screwed on said base element (9) and a length to which said base element (9) determines, via a spring arrangement (18) acting on said driven end (16), a releasing torque of the torque coupling.

3. A drill chuck in accordance with claim 2, wherein said cylindrical pipe (21) enters said cylindrical sleeve (28) and has a front portion that opposes said ring abutment (19) to form a stop, which with an appropriate amount of rotation runs up against a front edge (23) of said cylindrical sleeve (28) and thereby determines a maximum releasing torque.

4. A drill chuck in accordance with claim 3, wherein said length of a threaded portion (20) of said base element (9) determines a maximum torque.

5. A drill chuck in accordance with claim 4, wherein said shaft (8) is axially secured with respect to said jaw housing (2), and said shaft (8) and said jaw housing (2) have opposed annular grooves (24, 25) which guide a ring of balls (26).

6. A drill chuck in accordance with claim 3, wherein said base element (9) penetrates said wall bearing collars (11, 12) with a shaft (8) projecting coaxially into said jaw housing (2) to form a pivot bearing which acts to release the torque coupling, and the shaft (8) is axially secured with respect to said jaw housing (2).

7. A drill chuck in accordance with claim 5, wherein said spring arrangement (18) comprises a ring of a plurality of paraxially positioned helical springs which approximately fill an available free space radially and circumferentially formed between said cylindrical sleeve (28) and said base element (9), and the ring has an even number of springs which are alternately wound left and right.

8. A drill chuck in accordance with claim 7, wherein a plurality of O-rings act as spring elements.

9. A drill chuck in accordance with claim 2, wherein said spring arrangement (18) comprises a ring of a plurality of paraxially positioned helical springs which approximately fill an available free space radially and circumferentially formed between said cylindrical sleeve (28) and said base element (9), and the ring has an even number of springs which are alternately wound left and right.

10. A drill chuck in accordance with claim 2, wherein a plurality of O-rings act as spring elements.

11. A drill chuck in accordance with claim 1, wherein said cylindrical pipe (21) enters said cylindrical sleeve (28) and has a front portion that opposes said ring abutment (19) to form a stop, which with an appropriate amount of rotation runs up against a front edge (23) of said cylindrical sleeve (28) and thereby determines a maximum releasing torque.

12. A drill chuck in accordance with claim 1, wherein a length of a threaded portion (20) of said base element (9) determines a maximum torque.

13. A drill chuck in accordance with claim 1, wherein said bade element (9) penetrates said ball bearing collars (11, 12) with a shaft (8) projecting coaxially into said jaw housing (2) to form a pivot bearing which acts to release the torque coupling, and the shaft (8) is axially secured with respect to said jaw housing (2).

* * * * *